United States Patent
Yoder et al.

(10) Patent No.: US 12,086,036 B1
(45) Date of Patent: Sep. 10, 2024

(54) AUTOMATED RESTART OF ASYNCHRONOUS REMOTE REPLICATION AFTER FAILURES

(71) Applicant: Dell Products L.P., Hopkinton, MA (US)

(72) Inventors: Benjamin Yoder, Chandler, AZ (US); Deepika Hegde, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/193,902

(22) Filed: Mar. 31, 2023

(51) Int. Cl.
*G06F 11/14* (2006.01)
*G06F 11/07* (2006.01)

(52) U.S. Cl.
CPC ...... *G06F 11/1469* (2013.01); *G06F 11/0772* (2013.01); *G06F 11/1451* (2013.01); *G06F 11/1453* (2013.01); *G06F 2201/84* (2013.01)

(58) Field of Classification Search
CPC ............ G06F 11/1469; G06F 11/0772; G06F 11/1451; G06F 11/1453; G06F 2201/84
USPC ........................................................ 711/162
See application file for complete search history.

(56) References Cited

U.S. PATENT DOCUMENTS

| | | | |
|---|---|---|---|
| 9,817,606 B1* | 11/2017 | Byrne ................... | G06F 3/0664 |
| 11,281,694 B2* | 3/2022 | Reed .................... | G06F 11/3006 |
| 2019/0339870 A1* | 11/2019 | Meiri ................... | G06F 11/1464 |
| 2021/0382794 A1* | 12/2021 | Alonzo ............... | G06F 11/1464 |
| 2022/0155972 A1* | 5/2022 | Edara ...................... | G06F 3/065 |
| 2022/0237084 A1* | 7/2022 | Bhagi ................. | G06F 11/2097 |
| 2022/0263897 A1* | 8/2022 | Karr .................... | G06F 11/1471 |
| 2022/0358018 A1* | 11/2022 | Bar Shalom ........ | G06F 11/1464 |
| 2023/0205653 A1* | 6/2023 | Gupta ..................... | G06F 3/067 |
| 2023/0409597 A1* | 12/2023 | Kashi Visvanathan ...................... H04L 9/0836 | |

* cited by examiner

Primary Examiner — Than Nguyen
(74) Attorney, Agent, or Firm — Anderson Gorecki LLP

(57) ABSTRACT

A disaster recovery storage array automatically generates snapshots of replica storage objects responsive to detection of interruption of asynchronous replication of production storage objects of a primary storage system to the replica storage objects. The primary storage array accumulates updates to the production storage objects over a plurality of asynchronous replication cycles during the interruption. Asynchronous replication automatically resumes when the interruption ends. Accumulation of updates and resumption of asynchronous replication may be performed iteratively if there are multiple interruptions before the replica storage objects are consistent with the production storage objects. The snapshots are automatically discarded after the replica storage objects are made consistent with the production storage objects.

20 Claims, 5 Drawing Sheets

AUTOMATED RESTART OF ASYNCHRONOUS REMOTE REPLICATION AFTER FAILURES

TECHNICAL FIELD

The subject matter of this disclosure is generally related to data storage systems.

BACKGROUND

Organizational data storage systems maintain storage objects that contain data used by instances of host applications that run on host servers. Examples of host applications may include, but are not limited to, software for email, accounting, manufacturing, inventory control, and a wide variety of other organizational processes. Each storage object is a logical disk drive that abstracts the storage capacity of arrays of physical disk drives. A separate storage object or group of storage objects is typically created to store all data for a single host application.

It is known to configure pairs of storage systems to replicate data to help avoid data loss. In one configuration, a primary storage system maintains storage objects that are actively used by host applications and a secondary storage system maintains snapshots or replicas of those storage objects. A snapshot is an incremental copy of a storage object that includes only the updates made to the storage object since the most recent snapshot of the storage object was generated. A replica is a complete (non-incremental) copy of a storage object that may be updated synchronously or asynchronously. In order to generate a snapshot, a target storage object known as a snap volume is created and the snapped data is written to the snap volume. The frequency at which snapshots can be created is constrained by the storage and memory resources required to create and maintain snap volume metadata and multiple versions of the storage object data. Replicas do not require a new storage object to be created for each update so replicas can be updated more frequently than snapshots can be created. Typical snapshots may contain updates accumulated in one hour or longer time periods whereas replicas may be updated every thirty seconds or even more frequently. As a consequence, replicas often enable recovery to a closer point in time closer to a failure than snapshots. However, updates accumulated during temporary interruption of asynchronous replication are not necessarily applied to a replica in a predetermined order when asynchronous replication is resumed so the occurrence of additional interruptions before the storage objects and replicas are in a consistent state can be problematic.

SUMMARY

A method in accordance with some implementations comprises: automatically generating a snapshot of a replica storage object of a secondary storage system responsive to detection of interruption of asynchronous replication of a production storage object of a primary storage system to the replica storage object; accumulating updates to the production storage object over a plurality of asynchronous replication cycles during the interruption; and automatically resuming asynchronous replication of the production storage object to the replica storage object when the interruption ends.

An apparatus in accordance with some implementations comprises: a primary storage array comprising at least one compute node that manages access to a first array of drives on which a production storage object is stored; a secondary storage array comprising at least one compute node that manages access to a second array of drives on which a replica storage object of the production storage object is stored, the secondary storage array configured to automatically generate a snapshot of the replica storage object responsive to detection of interruption of asynchronous replication of the production storage object to the replica storage object; the primary storage array configured to accumulate updates to the production storage object over a plurality of asynchronous replication cycles during the interruption and automatically resume asynchronous replication of the production storage object to the replica storage object when the interruption ends.

In accordance with some implementations, a non-transitory computer-readable storage medium stores instructions that when executed by a storage array compute node perform a method comprising: automatically generating a snapshot of a replica storage object of a secondary storage system responsive to detection of interruption of asynchronous replication of a production storage object of a primary storage system to the replica storage object; accumulating updates to the production storage object over a plurality of asynchronous replication cycles during the interruption; and automatically resuming asynchronous replication of the production storage object to the replica storage object when the interruption ends.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and storage arrays.

Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
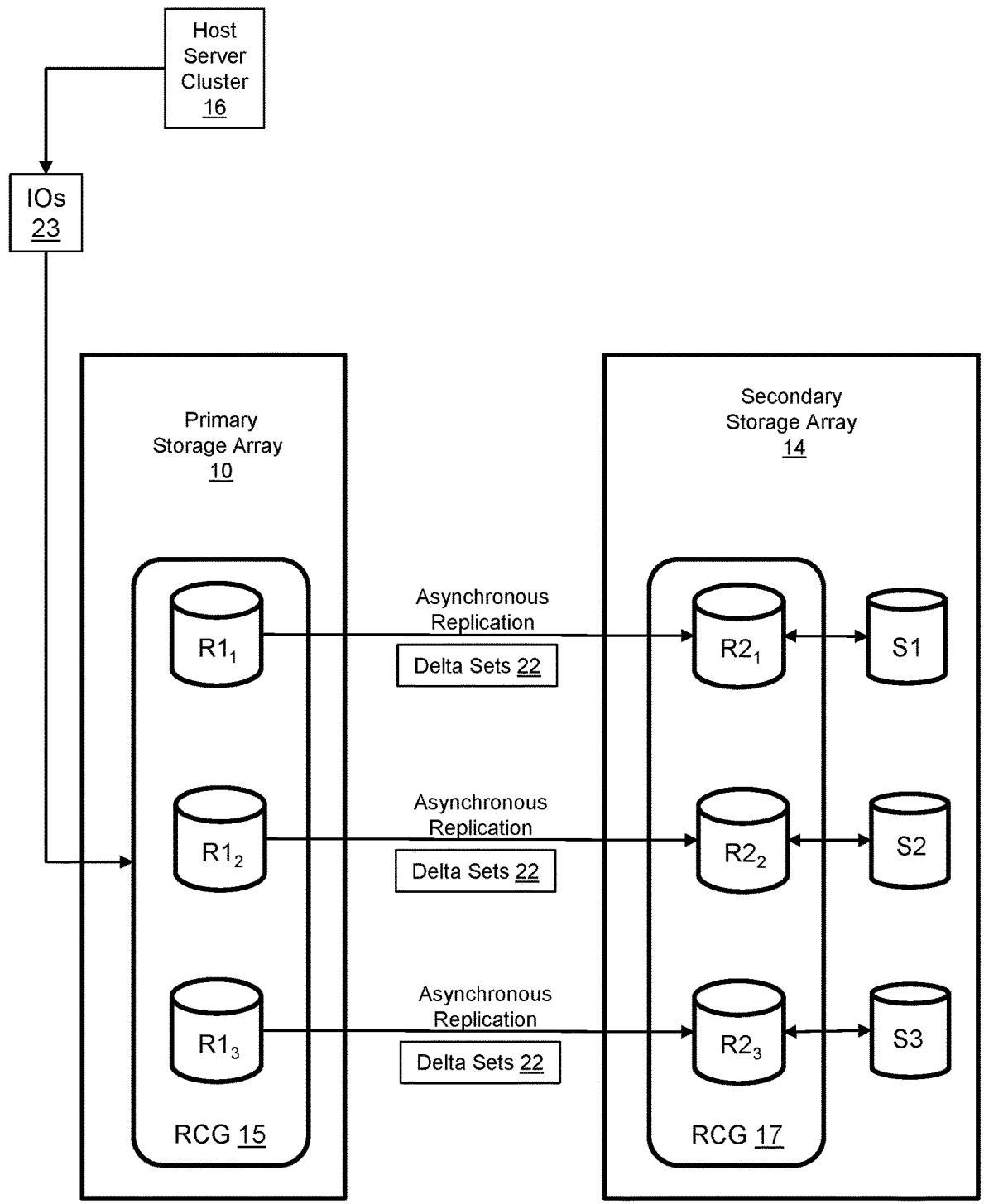
FIG. 1 illustrates a storage system in which asynchronous remote replication is automatically restarted after an interruption.

FIG. 1 illustrates a storage system in which asynchronous remote replication is automatically restarted after a temporary interruption. A primary "production" storage array 10 and a secondary "disaster recovery" storage array 14 are configured to asynchronously replicate production storage objects $R1_1$, $R1_2$, $R1_3$ to replica storage objects $R2_1$, $R2_2$, $R2_3$. The production storage objects $R1_1$, $R1_2$, $R1_3$ are associated with replication consistency group (RCG) 15 and the replica storage objects $R2_1$, $R2_2$, $R2_3$ are associated with replication consistency group 17. A replication consistency group is a logical container for a set of storage objects that contain an image of host application data. The production storage objects contain host application data that is accessed by instances of a host application running on a cluster 16 of host servers. The production storage objects are updated in response to write IOs 23 from the host servers. Updates to the production storage objects are accumulated and periodically sent to the disaster recovery site storage array 14 in fixed-time asynchronous replication cycles, e.g., every 5 seconds, 10 seconds, 30 seconds, or some other time period. A "delta set" 22 represents the updates accumulated and transmitted for one asynchronous replication cycle. The secondary storage array 14 uses the delta sets 22 received from the primary storage array 10 to update the replica storage objects. Updates are applied at the secondary storage array target only when there is a consistent image in a journal. A consistency group ensures that all writes to local production storage objects are written to the remote replicas in correct write-order and in a consistent way, so the remote replicas can be used instead of the local replicas if necessary.

In the event of a temporary interruption of asynchronous replication, the secondary storage array 14 automatically generates snapshots S1, S2, S3 of each of the replica storage objects $R2_1$, $R2_2$, $R2_3$ associated with the replication consistency group 17. The replica storage objects within the replication consistency group are snapped together so that the entire image can be recovered to the same point in time. Changes are tracked between the primary and secondary with an indication that the data needs to be propagated. Individual writes are not accumulated so multiple changes to the same block result in only one indication that the changes need to be shipped. When asynchronous replication resumes, there is a period of time during which accumulated changes are sent from the primary storage array 10 to the secondary storage array 14 in an order that is not predetermined and might not be chronological, so the replica storage objects may not be usable until resynchronization is completed, and the replica storage objects are consistent with the production storage objects. Asynchronous replication is automatically restarted in the event of further interruption due to resource limitations during this period of time. For example, if availability of free space in memory causes a temporary interruption of asynchronous replication, then asynchronous replication is automatically restarted when free space in memory becomes available. The snapshots can be used to restore the replica storage objects to a prior consistent state (before the initial interruption), which may be useful in the event of repeated or prolonged interruption of asynchronous replication during this period of time. The snapshots are automatically discarded after restoration of consistency between the production storage objects and the replica storage objects.

Figure 2:
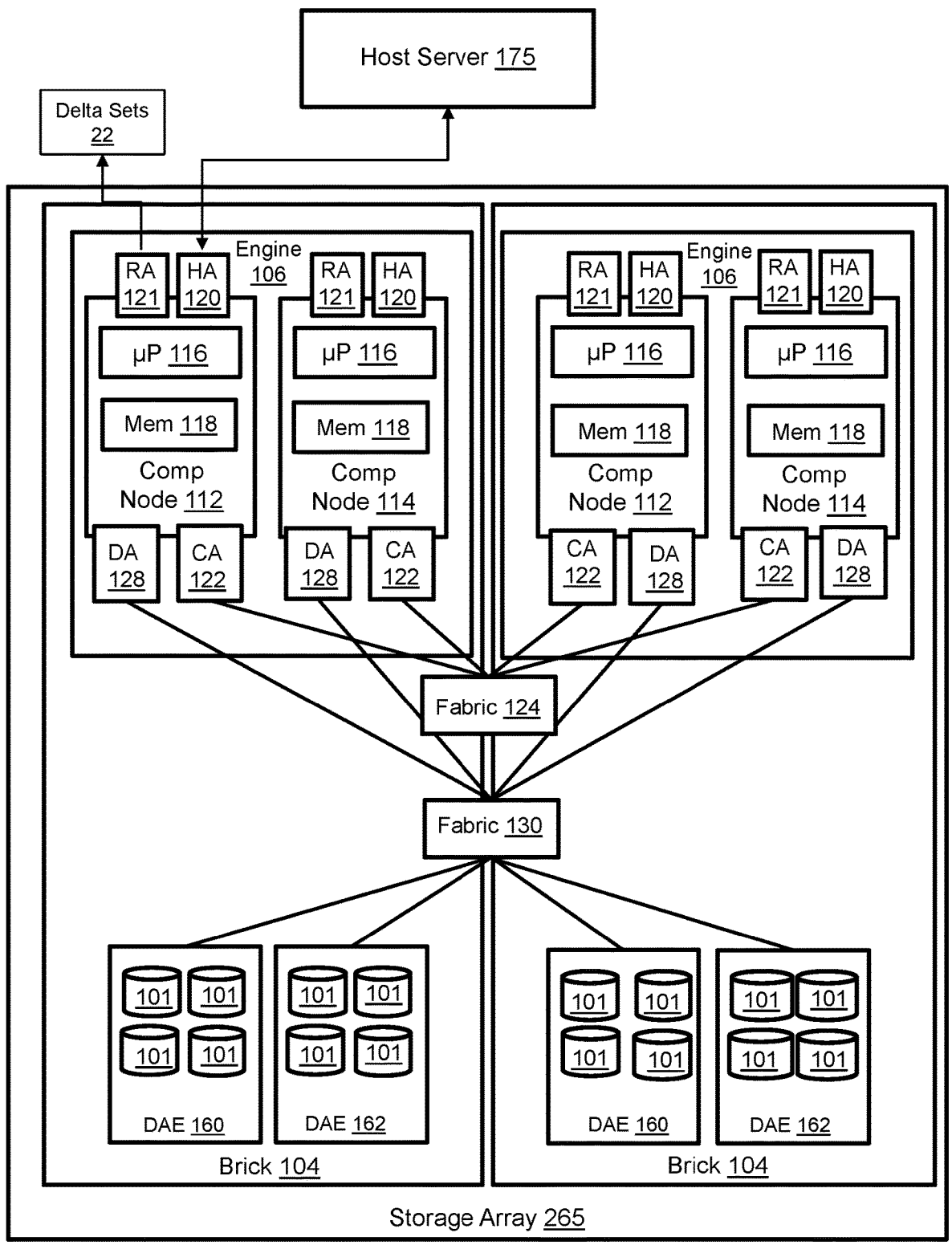
FIG. 2 illustrates a storage array in greater detail.

FIG. 2 illustrates a storage array 265 in greater detail. The primary and secondary storage arrays may be substantially similar. The storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes emulations such as one or more host adapters (HAs) 120 for communicating with host servers such as host server 175. Each host adapter has resources for servicing input-output commands (IOs) from host servers. The host adapter resources may include processors, volatile memory, and ports via which the hosts may access the storage array. Each compute node also includes a remote adapter (RA) 121 emulation for communicating with other storage systems, e.g., the other storage arrays for exchanging delta sets 22 for remote replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 emulations for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk 101.

Figure 3:
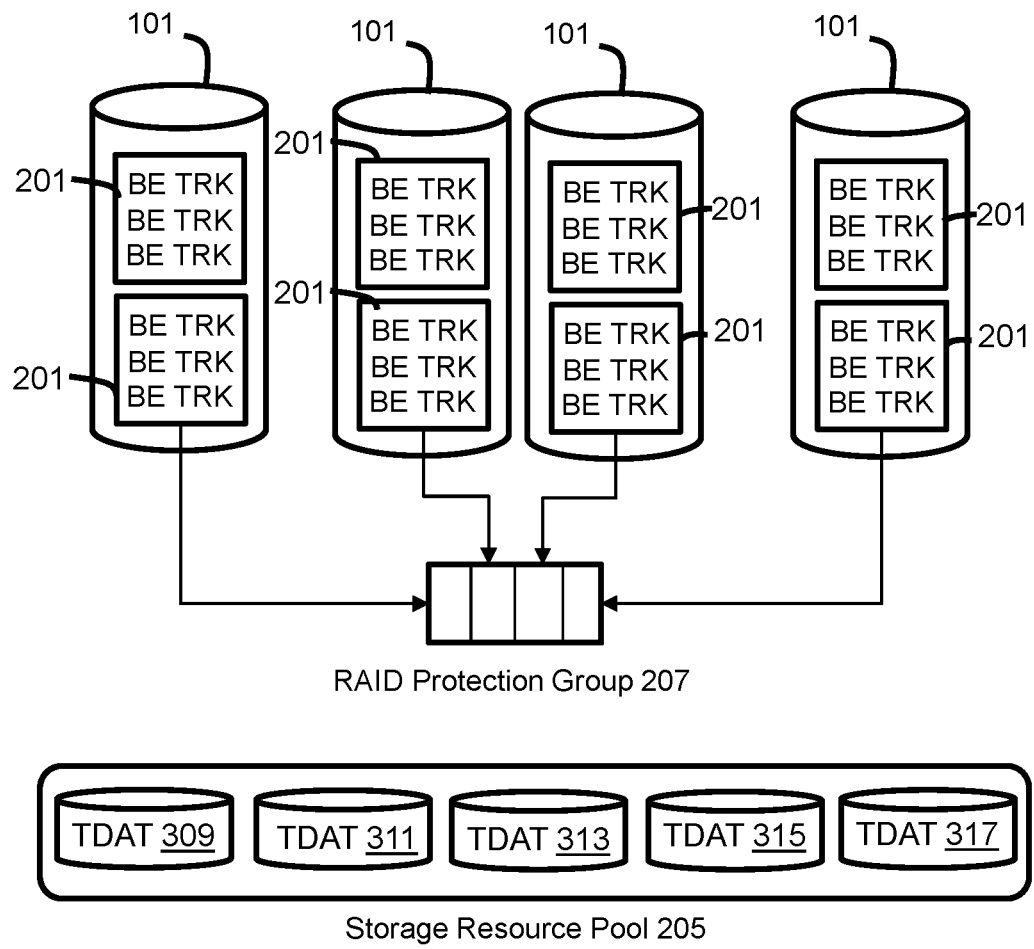
FIG. 3 illustrates layers of abstraction between the managed drives and replicated storage objects.

Referring to FIGS. 2 and 3, the host application data that is logically stored on the production storage objects $R1_1$, $R1_2$, $R1_3$ is persistently stored on the managed drives 101. Without limitation, storage objects such as the production storage objects may be referred to as volumes, devices, or LUNs, where a logical unit number (LUN) is a number used to identify logical storage volumes in accordance with the small computer system interface (SCSI) protocol. From the perspective of the host servers, each production storage object is a single disk having a set of contiguous logical block addresses (LBAs) on which data used by the instances of a host application resides. However, the host application data is stored at non-contiguous addresses on various managed drives 101. The replication consistency group 15 containing the production storage objects is created for an individual host application. Multiple instances of a single host application may use data from the same replication consistency group, but instances of different host applications do not use data from the same replication consistency group. The storage array may maintain a large number of production storage objects and replication consistency groups.

The compute nodes 112, 114 maintain metadata that maps between the LBAs of storage objects and physical addresses on the managed drives 101. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the primary replicas R1 of the production storage objects. The host application data is logically stored in front-end tracks (FE TRKs) on the primary replicas. The FE TRKs are mapped to the BE TRKs and vice versa by metadata known as track IDs (TIDs), which are pointers that are maintained in the shared memory.

Figure 4:
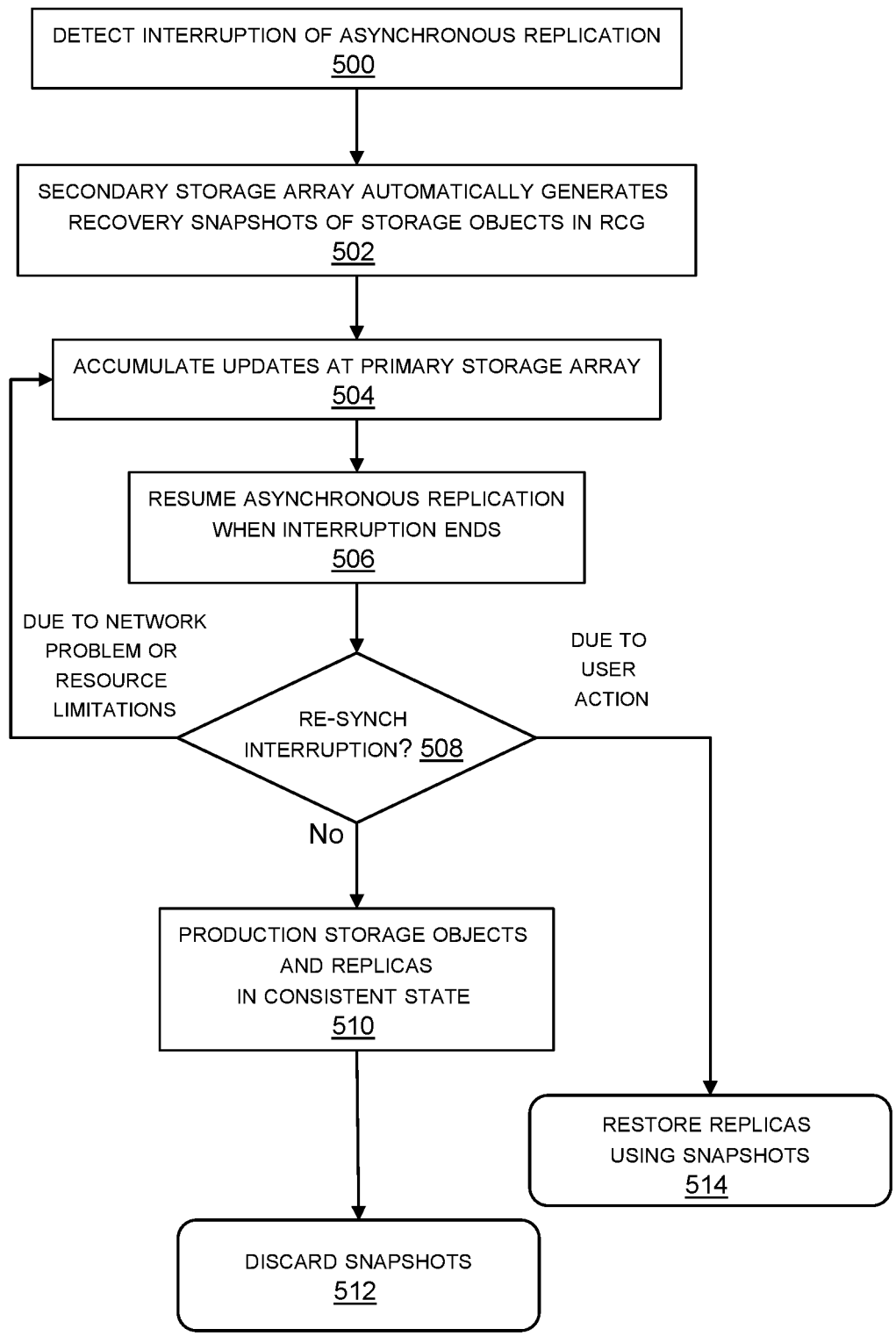
FIG. 4 illustrates a method for automatically restarting remote replication after an interruption.
Figure 5:
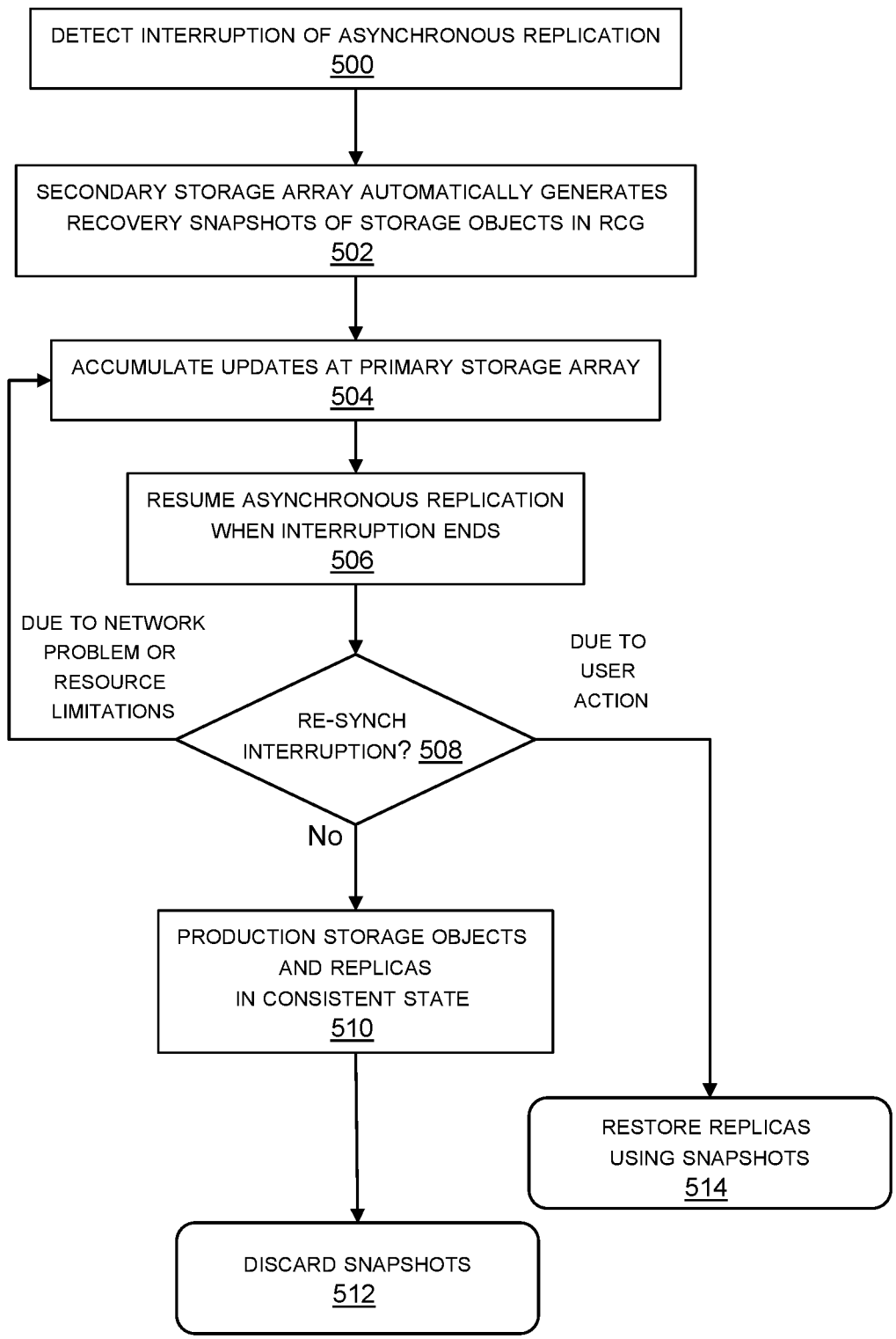

FIG. 4 illustrates a method for automatically restarting remote replication after an interruption. Step 500 is detecting the interruption of asynchronous replication. A variety of problems can cause an interruption of replication, possibly including, but not limited to, network congestion or failure, and resource starvation at the primary array or the secondary storage array, where resources include memory, storage, and processing, alone or in any combination. Interruptions may be detected in different ways depending on the cause. For example, a resource-starved primary storage array may determine that it is unable to send scheduled updates to the secondary storage array and use out-of-band signaling to communicate the interrupted state to the secondary storage array. In another example, network protocols may be relied upon to indicate to either or both storage arrays that interruption has occurred due to network problems. Although intermittent network failures between primary and secondary don't usually involve dropping replication, sustained network outages can cause resource shortages on the primary site as the size of the delta sets increase. Regardless of how the interruption is detected, the secondary storage array responds by automatically generating recovery snapshots of the storage object in the replication consistency group as indicated in step 502. The snaps may be taken together so that all the storage objects can be restored to the same point in time. The snaps are consistent with the production storage objects at that point in time. During the period of time when asynchronous replication is interrupted, the primary storage array accumulates updates as indicated in step 504. Interruption may last for any number of replication cycles so multiple updates of the same logical block addresses of the production storage objects may be accumulated. Asynchronous replication is automatically resumed when the interruption ends as indicated in step 506. This includes sending delta sets of accumulated updates from the primary storage array to the secondary storage array. The updates contained in the delta sets may be sent in a non-chronological order, so the replicas are temporarily inconsistent with the production storage objects until all updates have been applied to the replicas. After the production storage objects and corresponding replicas are brought into a consistent state in step 510 without interruption of resynchronization as determined in step 508, the snapshot are automatically discarded as indicated in step 512.

If an interruption occurs during the re-synch as determined in step 508 and thus before the replicas are consistent with the production storage objects, then flow proceeds based on the cause of the new interruption. If the new interruption occurred due to network problems, resource availability limitations, or some other technical problem then flow returns to step 504 and the primary storage array accumulates updates until asynchronous replication can resume. This loop may iterate automatically until the production storage object and the replicas are brought into a consistent state. If the new interruption is due to user action, then the replicas are restored to a prior consistent state using the snapshots as indicated in step 514. This may occur, for example, when an administrator determines that intermittent interruptions are likely to continue indefinitely and decides to halt asynchronous replication.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    automatically generating a snapshot of a replica storage object of a secondary storage system responsive to detection of interruption of asynchronous replication of a production storage object of a primary storage system to the replica storage object;
    accumulating updates to the production storage object over a plurality of asynchronous replication cycles during the interruption; and
    automatically resuming asynchronous replication of the production storage object to the replica storage object when the interruption ends.

2. The method of claim 1 further comprising automatically discarding the snapshot responsive to the replica storage object being made consistent with the production storage object by resumption of asynchronous replication.

3. The method of claim 1 further comprising accumulating updates to the production storage object over a plurality of asynchronous replication cycles during a plurality of interruptions that occur before the replica storage object is made consistent with the production storage object by resumption of asynchronous replication.

4. The method of claim 3 further comprising iteratively resuming asynchronous replication of the production storage object to the replica storage object when each of the interruptions ends.

5. The method of claim 1 further comprising restoring the replica storage object with the snapshot responsive to a disaster on the primary site or a customer action to stop asynchronous replication.

6. The method of claim 1 further comprising automatically generating snapshots of a plurality of replica storage objects of a replication consistency group of secondary storage system responsive to detection of interruption of asynchronous replication of a plurality of production storage objects of a replication consistency group of a primary storage system to the replica storage objects.

7. The method of claim 6 further comprising automatically discarding the snapshots responsive to the replica storage objects being made consistent with the production storage objects by resumption of asynchronous replication.

8. An apparatus comprising:
a primary storage array comprising at least one compute node that manages access to a first array of drives on which a production storage object is stored;
a secondary storage array comprising at least one compute node that manages access to a second array of drives on which a replica storage object of the production storage object is stored, the secondary storage array configured to automatically generate a snapshot of the replica storage object responsive to detection of interruption of asynchronous replication of the production storage object to the replica storage object;
the primary storage array configured to accumulate updates to the production storage object over a plurality of asynchronous replication cycles during the interruption and automatically resume asynchronous replication of the production storage object to the replica storage object when the interruption ends.

9. The apparatus of claim 8 further comprising the secondary storage array configured to automatically discard the snapshot responsive to the replica storage object being made consistent with the production storage object by resumption of asynchronous replication.

10. The apparatus of claim 8 further comprising the primary storage array configured to accumulate updates to the production storage object over a plurality of asynchronous replication cycles during a plurality of interruptions that occur before the replica storage object is made consistent with the production storage object by resumption of asynchronous replication.

11. The apparatus of claim 10 further comprising the primary storage array and the secondary storage array configured to iteratively resume asynchronous replication of the production storage object to the replica storage object when each of the interruptions ends.

12. The apparatus of claim 8 further comprising the secondary storage array configured to restore the replica storage object with the snapshot responsive to a disaster on the primary site or a customer action to stop asynchronous replication.

13. The apparatus of claim 8 further comprising the secondary storage array configured to automatically generate snapshots of a plurality of replica storage objects of a replication consistency group of secondary storage system responsive to detection of interruption of asynchronous replication of a plurality of production storage objects of a replication consistency group of a primary storage system to the replica storage objects.

14. The apparatus of claim 13 further comprising the secondary storage array configured to automatically discard the snapshots responsive to the replica storage objects being made consistent with the production storage objects by resumption of asynchronous replication.

15. A non-transitory computer-readable storage medium storing instructions that when executed by a computer perform a method comprising:
automatically generating a snapshot of a replica storage object of a secondary storage system responsive to detection of interruption of asynchronous replication of a production storage object of a primary storage system to the replica storage object;
accumulating updates to the production storage object over a plurality of asynchronous replication cycles during the interruption; and
automatically resuming asynchronous replication of the production storage object to the replica storage object when the interruption ends.

16. The non-transitory computer-readable storage medium of claim 15 in which the method further comprises automatically discarding the snapshot responsive to the replica storage object being made consistent with the production storage object by resumption of asynchronous replication.

17. The non-transitory computer-readable storage medium of claim 15 in which the method further comprises accumulating updates to the production storage object over a plurality of asynchronous replication cycles during a plurality of interruptions that occur before the replica storage object is made consistent with the production storage object by resumption of asynchronous replication.

18. The non-transitory computer-readable storage medium of claim 17 in which the method further comprises iteratively resuming asynchronous replication of the production storage object to the replica storage object when each of the interruptions ends.

19. The non-transitory computer-readable storage medium of claim 15 in which the method further comprises restoring the replica storage object with the snapshot responsive to a disaster on the primary site or a customer action to stop asynchronous replication.

20. The non-transitory computer-readable storage medium of claim 15 in which the method further comprises automatically generating snapshots of a plurality of replica storage objects of a replication consistency group of secondary storage system responsive to detection of interruption of asynchronous replication of a plurality of production storage objects of a replication consistency group of a primary storage system to the replica storage objects.

* * * * *